US012649333B2

(12) United States Patent (10) Patent No.: US 12,649,333 B2
Alcantara (45) Date of Patent: Jun. 9, 2026

(54) VEHICLE WHEEL ASSEMBLY WITH PROTECTED WASHER

(71) Applicant: GM GLOBAL TECHNOLOGY OPERATIONS LLC, Detroit, MI (US)

(72) Inventor: Avissai Alcantara, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 445 days.

(21) Appl. No.: 18/351,024

(22) Filed: Jul. 12, 2023

(65) Prior Publication Data

US 2025/0020173 A1 Jan. 16, 2025

(51) Int. Cl.
*B60B 27/00* (2006.01)
*F16D 3/223* (2011.01)

(52) U.S. Cl.
CPC ...... *B60B 27/0005* (2013.01); *F16C 2326/02* (2013.01); *F16D 2003/22326* (2013.01); *F16D 2300/18* (2013.01); *F16D 2300/22* (2013.01); *Y10S 464/906* (2013.01)

(58) Field of Classification Search
CPC ............. B60B 27/0005; F16C 2326/02; F16D 2003/22326; F16D 2300/18; F16D 2300/22; Y10S 464/906

USPC .................................................... 464/23, 178
See application file for complete search history.

(56) References Cited

U.S. PATENT DOCUMENTS 5,833,243 A * 11/1998 Booker ................ F16J 15/3252
464/133
7,118,182 B2 * 10/2006 Kayama .................. B60B 27/00
384/544

* cited by examiner

*Primary Examiner* — Greg Binda
(74) *Attorney, Agent, or Firm* — Ingrassia Fisher & Lorenz, LLP | IF&L

(57) ABSTRACT

Vehicles, wheel assemblies for vehicles, and methods for suppressing noise from vehicles are provided. A wheel assembly for a vehicle includes a knuckle; a wheel hub configured to rotate within the knuckle, the wheel hub extending from a proximal end to a distal end, wherein the distal end is configured for engaging a wheel; a constant velocity (CV) joint configured for transferring torque from power plant to the wheel hub, wherein the CV joint has an outer surface including a shoulder; a recess formed between the proximal end of the wheel hub and the shoulder of the CV joint; and a noise-canceling washer positioned in the recess, wherein the noise-canceling washer abuts the proximal end of the wheel hub and the shoulder of the CV joint.

19 Claims, 6 Drawing Sheets

VEHICLE WHEEL ASSEMBLY WITH PROTECTED WASHER

INTRODUCTION

The technical field generally relates to wheel mounting assemblies for vehicles, and more particularly to a recess for a wheel mounting assembly configured to receive, retain, and protect a washer.

Contemporary motor vehicles have wheel assemblies for mounting wheels and tires to a vehicle. The wheel assembly is provided with a pivoted steering knuckle that typically forms part of the wheel suspension. A wheel hub or mounting unit may be coupled to the steering knuckle, which in turn, is mounted on the vehicle chassis. The wheel bearings are mounted to the knuckle and coupled to the wheel hub allowing the wheel hub (and thus the wheels) to rotate relative to the vehicle.

In front wheel drive vehicles, the power plant that drives the vehicle is operationally engaged to the front wheels through a constant velocity joint ("CV joint"). The constant velocity joint is a mechanical coupling which allows free rotation (without an appreciable increase in friction or backlash) within a certain angular range. The power plant drives a transaxle which in-turn drives half shafts that extend between the transmission and the vehicle's front wheels. Each half shaft extends from one portion of the transmission to a corresponding wheel.

The components of the CV joint need to be properly secured to maintain their position and ensure smooth operation. Further, the CV joint must be securely connected to other components via a stable connection to minimize movement that can lead to noise generation. Also, proper clearances must be maintained within the CV joint and between the CV joint and other components in order to prevent excessive wear and damage. Moreover, it may be necessary to dampen vibrations occurring due to the movement and rotation of the CV components during the operation of a CV joint.

Accordingly, it is desirable to provide a wheel assembly for a vehicle that overcomes the detriments of prior, conventional wheel assemblies. Also, it is desirable to provide a vehicle wheel assembly configured to receive, retain, and protect a washer. Additionally, other desirable features and characteristics of the present disclosure will become apparent from the subsequent description taken in conjunction with the accompanying drawings and the foregoing introduction.

SUMMARY

A wheel assembly for a vehicle is provided and includes a knuckle: a wheel hub configured to rotate within the knuckle, the wheel hub extending from a proximal end to a distal end, wherein the distal end is configured for engaging a wheel: a constant velocity (CV) joint configured for transferring torque from power plant to the wheel hub, wherein the CV joint has an outer surface including a shoulder: a recess formed between the proximal end of the wheel hub and the shoulder of the CV joint; and a noise-canceling washer positioned in the recess, wherein the noise-canceling washer abuts the proximal end of the wheel hub and the shoulder of the CV joint.

In an embodiment of the wheel assembly, the recess is formed by an inner annular sidewall and an outer annular sidewall. In an embodiment of the wheel assembly, the inner annular sidewall and an outer annular sidewall are separated by a radial distance, the noise-canceling washer has a radial length, and the radial distance is at least 90% of the radial length. In an embodiment of the wheel assembly, the noise-canceling washer is separated from at least one of the inner annular sidewall and the outer annular sidewall by a lateral gap.

In an embodiment of the wheel assembly, the recess has a depth, the noise-canceling washer has a height, and the height is greater than the depth. In an embodiment of the wheel assembly, the height is at least 140% of the depth.

In an embodiment of the wheel assembly, the recess is formed in the shoulder of the CV joint, the outer surface of the CV joint forms an inner annular sidewall, an outer annular sidewall, and a recess bottom surface extending from the inner annular sidewall to the outer annular sidewall. In an embodiment of the wheel assembly, the proximal end of the wheel hub has a planar surface with a radial length, the noise-canceling washer has a radial length, and the radial length of the planar surface of the proximal end of the wheel hub is at least 110% of the radial length of the noise-canceling washer.

In an embodiment, the wheel assembly further includes a wheel sensor including a ring magnet positioned on the outer surface of the CV joint.

A vehicle is provided and includes a power plant: a transaxle powered by the power plant: a wheel hub having a proximal end: a wheel mounted to the wheel hub: a constant velocity joint ("CV joint") configured to translate torque from the transaxle to the wheel, wherein the CV joint includes an outer joint having an outer surface; and a noise-canceling washer located between the wheel hub and the CV joint, wherein the noise-canceling washer is retained by an outer sidewall located radially outward from the noise-canceling washer.

In an embodiment of the vehicle, the washer is located between an inner sidewall and the outer sidewall. In an embodiment of the vehicle, each sidewall is a portion of a right cylinder.

In an embodiment, the vehicle further includes a wheel speed sensor including a ring magnet, wherein the wheel speed sensor is mounted on the CV joint.

In an embodiment of the vehicle, the sidewall has a sidewall height, the noise-canceling washer has a washer height, and the washer height is at least 150% greater than the sidewall height.

In an embodiment of the vehicle, the noise-canceling washer is located between the proximal end of the wheel hub and a shoulder of the CV joint, a distance separates the proximal end of the wheel hub and the shoulder of the CV joint, the noise-canceling washer has a height, and the height is at least 200% of the first distance.

In an embodiment of the vehicle, a recess is formed in the CV joint, and the outer sidewall is formed in the CV joint and partially bounds the recess.

A method for suppressing noise from a vehicle is provided and includes assembling a wheel hub to a constant velocity (CV) joint, wherein the wheel hub extends from a proximal end to a distal end, wherein the distal end is configured for engaging a wheel, and wherein the CV joint has an outer surface including a shoulder: locating a noise-canceling washer between the proximal end of the wheel hub and the shoulder of the CV joint; and retaining the noise-canceling washer between the proximal end of the wheel hub and the shoulder of the CV joint with an outer sidewall located radially outward from the noise-canceling washer.

In an embodiment, the method further includes forming the CV joint with a recess and the outer sidewall in the shoulder, wherein the noise-canceling washer is located in the recess.

In an embodiment of the method, the recess has a depth, the noise-canceling washer has a height, and the height is at least 140% of the depth.

In an embodiment, the method further includes mounting a wheel sensor comprising a magnet ring on the CV joint.

DESCRIPTION OF THE DRAWINGS

The present disclosure will hereinafter be described in conjunction with the following drawing figures, wherein like numerals denote like elements, and wherein.

DETAILED DESCRIPTION

Figure 1:
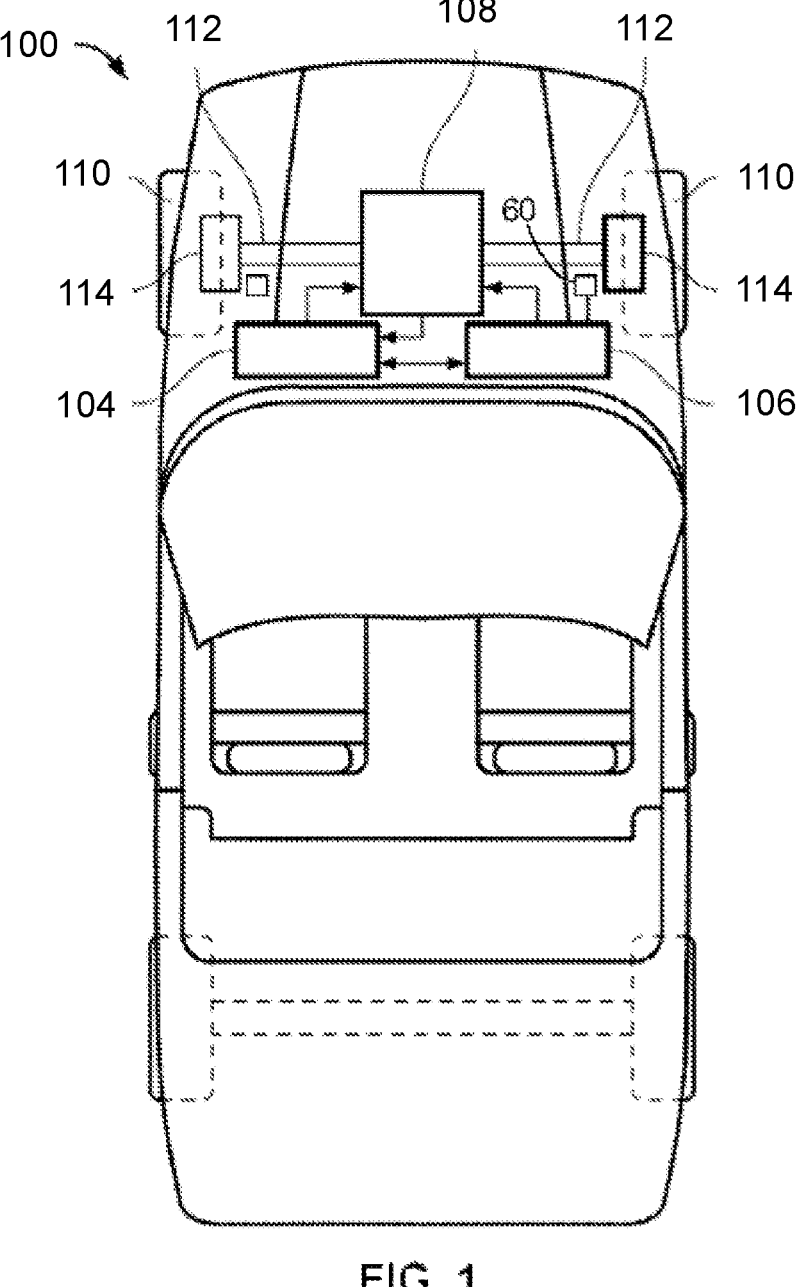
FIG. 1 is a schematic view of a vehicle suitable for using exemplary embodiments of the present disclosure.

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

Finally, for the sake of brevity, conventional techniques and components related to vehicle mechanical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that the figures are merely illustrative and may not be drawn to scale.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

An exemplary vehicle, wheel assembly, and method are provided to safely reduce noise from a constant velocity joint that may occur as a result of a change of direction, a change in acceleration, or other events. In exemplary embodiments, a noise-cancelling washer is located between the hub bearing of the wheel assembly and the out board shaft of the constant velocity joint. More specifically, the wheel assembly provides a washer recess with sidewalls configured to hold the noise-canceling washer in position during use.

Further, an exemplary vehicle includes a ring magnet. The ring magnet may be located radially outward from the noise-canceling washer. The ring magnet may be, or be a part of, an anti-lock braking system (ABS) wheel speed sensor. The ring magnet may provide information to a control module, such as an engine control unit (ECU), regarding wheel speed. If the ring magnet becomes contaminated by debris, such as metallic debris, the information provided to the ECU may be inaccurate. For example, such information may be outside the normal parameters of control and can affect anti-lock braking system (ABS) performance and vehicular dynamic controls. Thus, embodiments herein are provided to prevent contamination of the ring magnet.

Specifically, in some embodiments, the washer recess and sidewalls are configured to hold the noise-canceling washer even if the washer is broken and forms debris. For example, in certain high torque direction reversal modes such as reversal torque direction during BEV energy regeneration events, the noise-canceling washer may be broken into two or more pieces. As described herein the washer recess and sidewalls prevent movement of the broken washer out of the recess and into contact with the ring magnet located nearby. Thus, damage to the washer may not result in brake/vehicular dynamic affects due to poor information collection and/or communication by the ring magnet.

Further, due to the formation of the recess in the wheel assembly, the noise-canceling washer need not be provided with any installation or mounting tabs. Thus, the shape of the noise-canceling washer may be simplified and stresses within the noise-canceling washer may be reduced.

Referring to the drawings, wherein like reference numbers refer to like components, FIG. 1 is a simplified schematic representation of an embodiment of a vehicle 100 suitable for use with exemplary embodiments of the present disclosure. Although the vehicle 100 is illustrated as a purely electric vehicle, the techniques and concepts described herein are also applicable to hybrid electric vehicles or vehicles having internal combustion engines. The vehicle 100 may be any one of a number of different types of vehicles, such as, for example, a sedan, a wagon, a truck, or a sport utility vehicle (SUV), and may be two-wheel drive (2WD), four-wheel drive (4WD), or all-wheel drive (AWD). In various embodiments, the vehicle 100 may incorporate any one of, or combination of, a number of different types of engines, such as, for example, an electric motor, a gasoline or diesel fueled combustion engine, a flex fuel vehicle (FFV) engine (i.e., using a mixture of gasoline and alcohol) or a gaseous compound (e.g., hydrogen and/or natural gas) fueled engine.

The illustrated embodiment of the electric vehicle 100 includes, without limitation an energy storage system 104, a control module 106, such as or including an engine control unit (ECU), and a powertrain 108.

The energy storage system 104 may be realized as a rechargeable battery pack having a single battery module or any number of individual battery cells operatively interconnected (e.g., in series or in parallel), to supply electrical energy. A variety of battery chemistries may be employed within the energy storage system 104 such as, lead-acid, lithium-ion, nickel-cadmium, nickel-metal hydride, etc. In an electric vehicle embodiment, the energy storage system 104 may include a generator for charging the energy storage system. In a hybrid-electric vehicle embodiment, the internal combustion engine component of the drivetrain 108 may be used for charging the energy storage system. Also, in an internal combustion engine embodiment, an alternator may be used to change the energy storage system, which in this embodiment, comprises the vehicle battery to operate the starter and other electrical systems of the vehicle 100.

The control module 106, may include any type of processing element or vehicle controller, and may be equipped with nonvolatile memory, random access memory (RAM), discrete and analog input/output (I/O), a central processing unit, and/or communications interfaces for networking within a vehicular communications network. The control module 106 is coupled to the energy storage system 104 and the powertrain 108 and controls the flow of electrical energy between these modules depending on a required power command, the state of charge of the energy storage system 104, etc.

The powertrain 108 includes an electric motor and a transmission for driving front wheels 110 via drive shafts 112 to propel the vehicle 100. The front wheels 110 are coupled to the vehicle 100 in a rotary manner via wheel assemblies 114. The wheel assemblies 114 allow the wheels 110 to pivot with respect to the vehicle to enable the user to steer the vehicle during operation.

As shown in FIG. 1, the vehicle is provided with a wheel speed sensor 60. An exemplary wheel speed sensor 60 is coupled to the control module 106 and may communicate wheel speed information to the control module 106. For example, wheel speed sensors 60 may detect the various angular speeds at which each steerable wheel rotates. The various angular speeds of steerable wheels may be used to apply braking pressure to each individual steerable wheel through a brake system. In exemplary embodiments, the wheel speed sensor 60 is or includes a magnet, such as a ring magnet.

Figure 2:
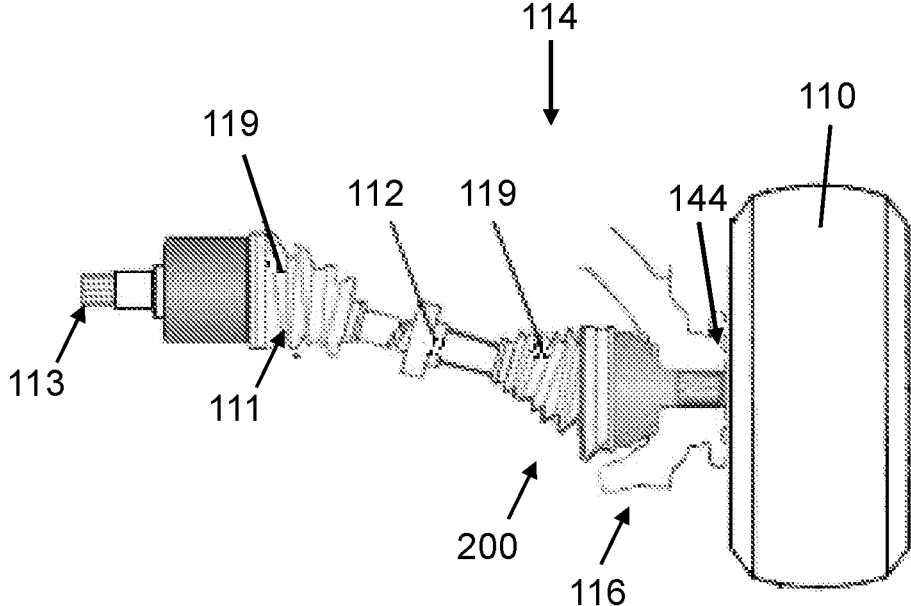
FIG. 2 is a schematic view of a wheel assembly according to embodiments of the present disclosure.

FIG. 2 illustrates an exemplary drive shaft 112 and wheel assembly 114 that are provided to translate torque from a transaxle 113 to a wheel 110. As shown, the drive shaft 112, is a constant velocity (CV) axle, (also known as a half shaft), which may be used in front-wheel drive vehicles to transfer the power from the transaxle 113 to a drive wheel 110. The CV axle 112 has two CV joints (an inner joint 111 and an outer joint 200). These joints 111 and 200 allow the axle 112 to transfer power to the drive wheel 110 at a constant speed while accommodating for the different travel conditions, including the up and down motion of the suspension and cornering.

The CV joints 111 and 200 may be packed with grease for lubrication. To keep the grease in the joints 111 and 200, and to keep out moisture, dirt and roadway grime, the joints 111 and 200 may be covered with a boot 119, called a CV boot, as shown. CV boots 119 may be made of a durable rubber that can withstand extreme weather and travel conditions.

As further shown in FIG. 2, the outer CV joint 200 is coupled to a wheel hub 144 that is coupled to the wheel 110. As shown, the wheel hub 144 may be rotatable with respect to a knuckle 116, which is fixed, but pivotably mounted to the vehicle chassis and suspension system.

Figure 3:
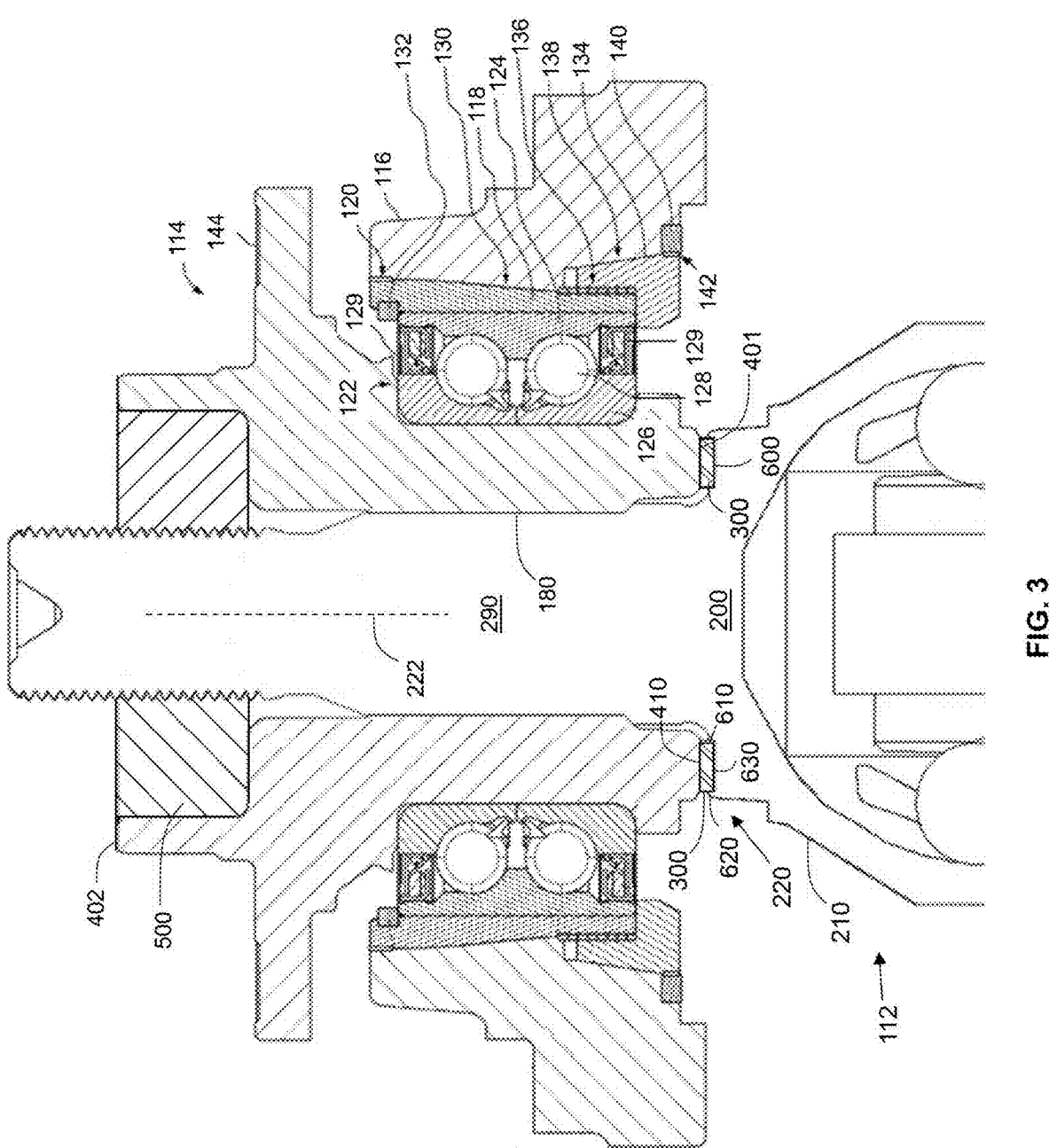
FIG. 3 is a cross-sectional view of a wheel assembly according to embodiments of the present disclosure.

FIG. 3 is an illustration of one embodiment of a wheel assembly 114 suitable for use with a CV axle or drive shaft 112 in the vehicle 100. As shown, the wheel assembly 114 includes a knuckle 116 that receives a taper sleeve 118. In some embodiments, the knuckle 116 and the tapered sleeve 118 couple at contoured interface 120. The contoured interface 120 may be realized as having a sinusoidal shaped circumference to prevent rotation between the knuckle 116 and the tapered sleeve 118. In other embodiments, various contoured shapes may be used to impede rotation between the knuckle 116 and the tapered sleeve 118. The tapered sleeve receives a bearing 122 that includes an outer flange 124, an inner flange 126 and a plurality of roller bearings 128. Additionally, the bearing 122 may include seals 129 to inhibit water and dust intrusion.

To develop clamp loading for the bearing 122, the knuckle 116 and the tapered sleeve 118 couple along a tapered interface 130. In some embodiments, the bearing 122 is retained within the tapered sleeve 118, and thus the knuckle 116, via a retaining ring 132. In other embodiments, the retaining ring 132 could be integrally formed with the tapered sleeve 118. The opposite end of the tapered sleeve 118 is threaded to receive a threaded fastener 134 along a threaded interface 136. The threaded fastener 134 couples to the knuckle 116 along a tapered interface 138, which also develops clamp load for the bearing 122. According to various embodiments, the threaded fastener 134 replaces the plurality of individual fasteners required by conventional wheel assemblies, thus reducing mass and drag for the vehicle (100 in FIG. 1). To impede rotation under load, some embodiments include a contoured retainer 140 that provides a contoured interface 142 between the threaded fastener 134 and the knuckle 116.

As shown, the wheel assembly 114 includes a wheel hub 144 that couples to the inner flange 126 of the bearing 122. This allows the wheel hub 144 (and thus a wheel for the vehicle) to rotate with respect to the knuckle 116 which is fixed, but pivotably mounted to the vehicle chassis and suspension system (not shown in FIG. 3).

The wheel hub 144 extends in the direction of a wheel hub rotation axis 222 from a proximal end 401 to a distal end 402, i.e., toward the wheel. As shown, the proximal end 401 may include a proximal surface 410 that extends radially away from the wheel hub rotation axis 222. In some embodiments, the proximal surface 410 is perpendicular to the wheel hub rotation axis 222.

For driven wheels, the wheel hub 144 may optionally receive the drive shaft 112, which will propel the vehicle 100 via the powertrain 108 (see FIG. 1). Specifically, the wheel hub 144 receives the outer joint 200 of drive shaft 112. The wheel hub and a distal portion 290 of outer joint 200 may engage one another with splines 180 that prevent relative rotation between the two components.

As shown, the outer joint 200 has an outer surface 210 that is formed with a shoulder 220. The shoulder 220 extends radially away from the rotation axis 222, and may be perpendicular to the rotation axis 222.

In some embodiments, a recess 600 is formed in the shoulder 220 of the outer surface 210 of the outer joint 200 and/or in the proximal surface 410 of the wheel hub 140. In FIG. 3, the recess 600 is formed in the shoulder 220 of the outer surface 210 of the outer joint 200. As shown, the recess 600 includes an annular inner sidewall 610, and annular outer sidewall 620, and a radially-extending end wall 630. The annular inner sidewall 610 may be cylindrical and formed at a constant radius about the rotation axis 222, i.e., the annular inner sidewall 610 may be a portion of a right circular cylinder. Also, the annular outer sidewall 620 may be cylindrical and formed at a constant radius about the rotation axis 222, i.e., the annular outer sidewall 620 may be a portion of a right circular cylinder. The radially-extending end wall 630 may be perpendicular to the rotation axis 222.

As shown, the wheel assembly 114 further includes a noise-canceling washer 300. As shown, the noise-canceling washer 300 is located between the shoulder 220 of the outer surface 210 of the outer joint 200 and the proximal surface 410 of the wheel hub 144. Specifically, the noise-canceling washer 300 is located at least partially within the recess 600.

In some embodiments, a nut 500 is threaded onto the distal portion 290 of the outer joint 200 to clamp the wheel hub 144 and the outer joint 200 together, thereby exerting a compression force on the noise-canceling washer 300 between the shoulder 220 of the outer surface 210 of the outer joint 200 and the proximal surface 410 of the wheel hub 144.

Figure 4:
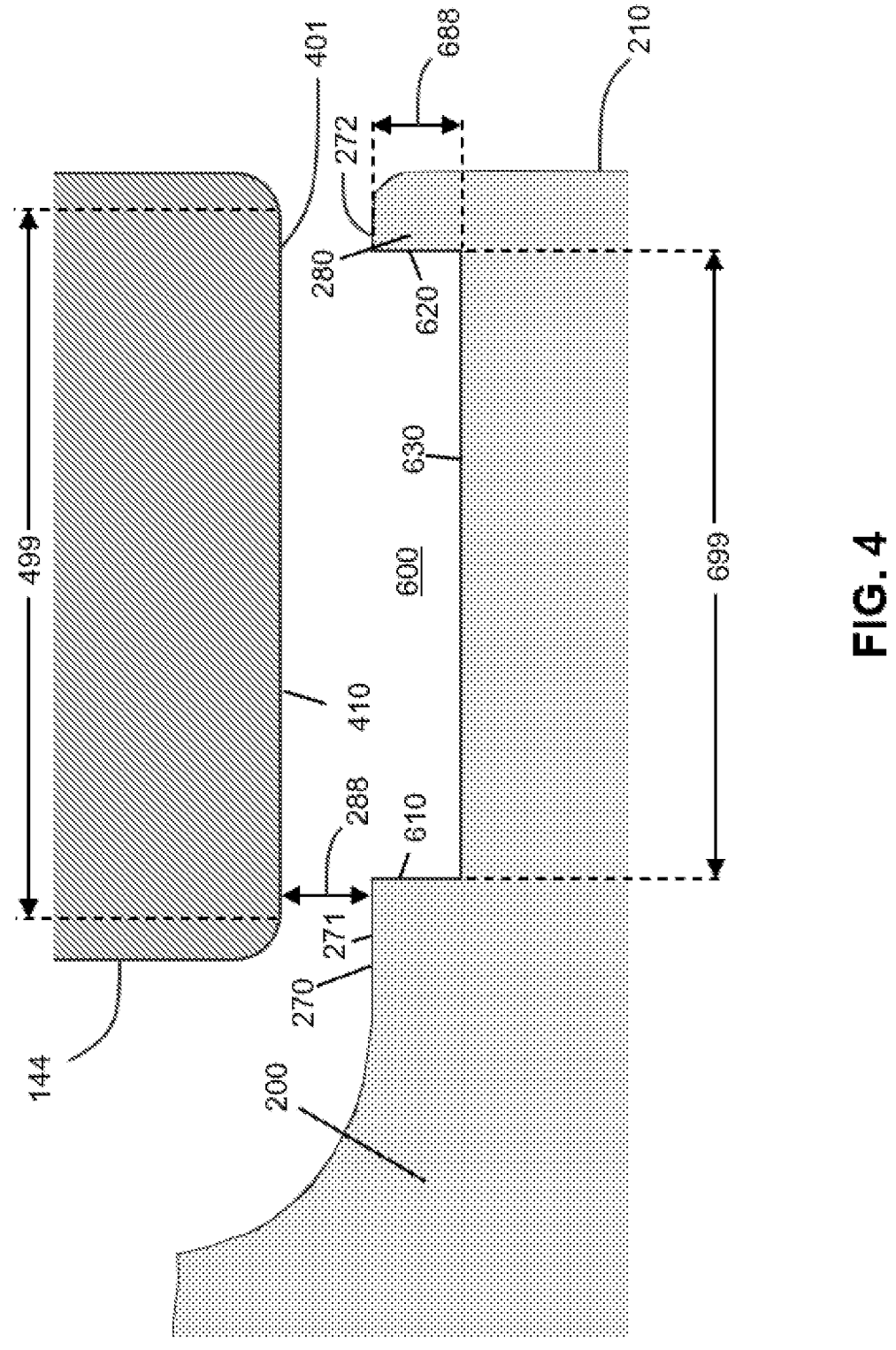
FIG. 4 is a cross-sectional view of the interface between a wheel hub and outer joint in a wheel assembly according to embodiments of the present disclosure.
Figure 5:
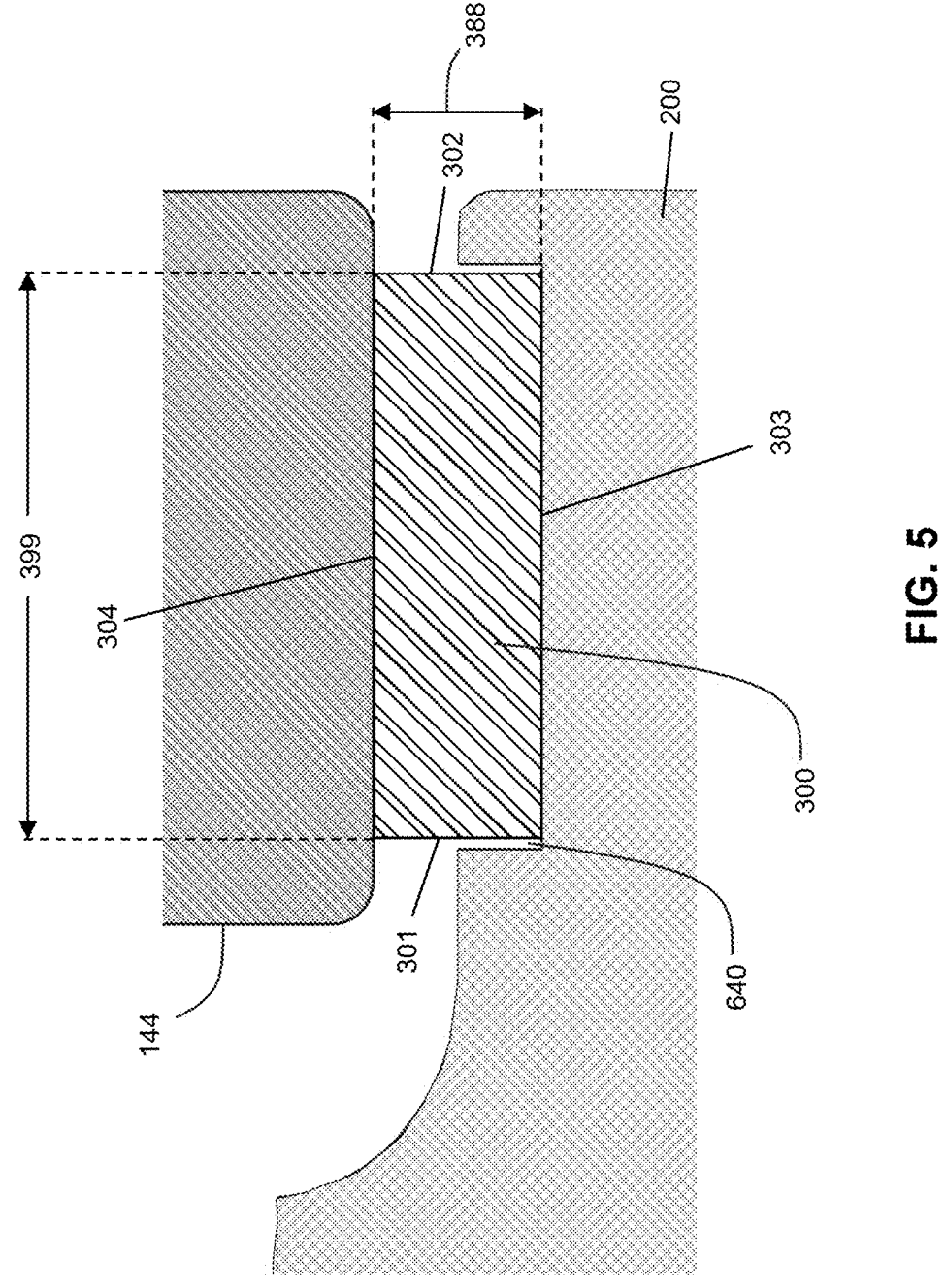
FIG. 5 is a cross-sectional view of a washer located at the interface between a wheel hub and outer joint in a wheel assembly according to embodiments of the present disclosure.

Cross-referencing FIG. 3 with FIGS. 4 and 5, the structure of the washer 300 and recess 600 is further described. FIG. 4 is a cross-sectional view of the interface between the proximal surface 410 of the proximal end 401 of the wheel hub 144 and the shoulder 220 of the outer surface 210 of the outer joint 200, after assembly but with the washer 300 not illustrated for clarity of discussion. FIG. 5 is a cross-sectional view of the interface between the proximal surface 410 of the proximal end 401 of the wheel hub 144 and the shoulder 220 of the outer surface 210 of the outer joint 200, after assembly and with the washer 300 illustrated. It is noted that in both FIGS. 4 and 5, the wheel hub 144 and outer joint 200 are in an assembled configuration.

In FIG. 4, at the shoulder 220, the outer surface 210 includes a planar surface 270 that extends in a radial direction, such as perpendicular to the rotation axis. For example, the planar surface 270 may form an annulus. As shown, the recess 600 is formed in the shoulder 220, such that the planar surface 270 is separated into an inner portion 271 and an outer portion 272. Further, the planar surface 270 of the shoulder 220 of the outer joint 200 is separated from the proximal surface 410 of the proximal end 401 of the wheel hub 144 by a distance 288. In some embodiments, distance 288 is at least 0.1 mm, such as at least 0.25 mm, at least 0.5 mm, at least 0.75 mm, at least 1 mm, at least 1.25 mm, at least 1.5 mm, at least 1.75 mm, at least 2 mm, at least 3 mm, at least 4 mm, or at least 5 mm. In some embodiments, distance 288 is at most 5 mm, at most 4 mm, at most 3 mm, at most 2.5 mm, at most 2.25 mm, at most 2 mm, at most 1.75 mm, at most 1.5 mm, at most 1.25 mm, at most 1 mm, at most 0.75 mm, at most 0.5 mm, or at most 0.25 mm.

The recess 600 is annular and in the illustrated embodiment, the inner sidewall 610 of the recess 600 and the outer sidewall 620 of the recess 600 are parallel and each have a height 688. In other words, the recess 600 has a depth 688. In some embodiments, the height 688 of each sidewall 610 and 620 is the same, though the heights 688 may be different. In some embodiments, height 688 is at least 0.1 mm, such as at least 0.25 mm, at least 0.5 mm, at least 0.75 mm, at least 1 mm, at least 1.25 mm, at least 1.5 mm, at least 1.75 mm, at least 2 mm, at least 3 mm, at least 4 mm, or at least 5 mm. In some embodiments, height 688 is at most 5 mm, at most 4 mm, at most 3 mm, at most 2.5 mm, at most 2.25 mm, at most 2 mm, at most 1.75 mm, at most 1.5 mm, at most 1.25 mm, at most 1 mm, at most 0.75 mm, at most 0.5 mm, or at most 0.25 mm.

Further, the inner sidewall 610 of the recess 600 and the outer sidewall 620 of the recess 600 are separated by a radial distance 699 or recess width 699. Accordingly, the radially-extending end wall 630 or bottom surface 630 extends for a radial length equal to radial distance 699. In some embodiments, the radial distance 699 is at least 3 mm, at least 3.5 mm, at least 4 mm, at least 4.5 mm, at least 5 mm, at least 5.5 mm, at least 6 mm, at least 6.5 mm, at least 7 mm, or at least 7.5 mm. In some embodiments, the radial distance 699 is at most 10 mm, at most 8 mm, at most 7.5 mm, at most 7 mm, at most 6.5 mm, at most 6 mm, at most 5.5 mm, at most 5 mm, at most 4.5 mm, at most 4 mm, or at most 3.5 mm.

As shown in FIG. 4, the proximal surface 410 of the proximal end 401 of the wheel hub 144 is planar. Further, the planar surface 410 has a radial length 499. For example, the planar surface 410 may form a disk shape. In some embodiments, the radial length 499 is greater than the radial distance 699 of the recess 600. For example, radial length 499 may be at least 101%, at least 102%, at least 103%, at least 104%, at least 105%, at least 110%, at least 120%, at least 130%, at least 140%, at least 150%, at least 160%, at least 170%, at least 180%, at least 190%, or at least 200% of the radial distance 699. Further, radial length 499 may be at most 200%, at most 190%, at most 180%, at most 170%, at most 160%, at most 150%, at most 140%, at most 130%, at most 120%, at most 110%, at most 105%, at most 104%, at most 103%, at most 102%, or at most 101%.

The washer 300 is illustrated in FIG. 5 and abuts the proximal end 401 of the wheel hub 144 and the shoulder 220 of the CV joint 200. An exemplary washer 300 is a magnetic metal, such as steel. Further, the washer 300 may be coated with a noise-canceling material coating. An exemplary washer 300 and is dimension to be received within the annular recess 600.

As shown, the washer 300 has an inner sidewall 301, an outer sidewall 302, a proximal surface 303, and a distal surface 304. As shown, the inner sidewall 301 of the washer 300 and the outer sidewall 302 of the washer 300 are parallel and each have a height 388. Accordingly, the proximal surface 303 and the distal surface 304 are separated by height 388. In some embodiments, the height 388 of each sidewall 301 and 302 is the same, though the heights 388 may be different. In some embodiments, height 388 is at least 0.5 mm, at least 0.75 mm, at least 1 mm, at least 1.25 mm, at least 1.5 mm, at least 1.75 mm, at least 2 mm, at least 2.5 mm, at least 3 mm, at least 3.5 mm, at least 4 mm, at least 4.5 mm, at least 5 mm, at least 5.5 mm, at least 6 mm, at least 6.5 mm, at least 7 mm, at least 7.5 mm, at least 8 mm, at least 8.5 mm, at least 9 mm, at least 9.5 mm, at least 10 mm. In some embodiments, height 388 is at most 10 mm, at most 9.5 mm, at most 9 mm, at most 8.5 mm, at most 8 mm, at most 7.5 mm, at most 7 mm, at most 6.5 mm, at most 6 mm, at most 5.5 mm, at most 5 mm, at most 4.5 mm, or at most 4 mm.

Height 388 of the washer 300 is equal to or greater than height 688 of the recess 600. In certain embodiments, height 388 is at least 110%, at least 120%, at least 130%, at least 140%, at least 150%, at least 160%, at least 170%, at least 180%, at least 190%, or at least 200% of height 688. In certain embodiments, height 388 is at most 300%, at most 250%, at most 200%, at most 190%, at most 180%, at most 170%, at most 160%, at most 150%, at most 140%, at most 130%, at most 120%, or at most 110% of height 688.

Height 388 of the washer 300 is greater than distance 288. In certain embodiments, height 388 is at least 110%, at least 120%, at least 130%, at least 140%, at least 150%, at least 160%, at least 170%, at least 180%, at least 190%, at least 200%, at least 210%, at least 220%, at least 230%, at least 240%, at least 250%, at least 260%, at least 270%, at least 280%, at least 290%, or at least 300% of distance 288. In certain embodiments, height 388 is at most 300%, at most 290%, at most 280%, at most 270%, at most 260%, at most 250%, at most 240%, at most 230%, at most 220%, at most 210%, at most 200%, at most 190%, at most 180%, at most 170%, at most 160%, at most 150%, at most 140%, at most 130%, at most 120%, or at most 110% of distance 288.

As shown, the inner sidewall 301 of the washer 300 and the outer sidewall 302 of the washer 300 are separated by a radial length 399. Accordingly, the proximal surface 303 and the distal surface 304 each extend for a radial length equal to radial length 399. In some embodiments, the radial length 399 is at least 3 mm, at least 3.5 mm, at least 4 mm, at least 4.5 mm, at least 5 mm, at least 5.5 mm, at least 6 mm, at least 6.5 mm, at least 7 mm, or at least 7.5 mm. In some embodiments, the radial length 399 is at most 10 mm, at most 8 mm, at most 7.5 mm, at most 7 mm, at most 6.5 mm, at most 6 mm, at most 5.5 mm, at most 5 mm, at most 4.5 mm, at most 4 mm, or at most 3.5 mm. In certain embodiments, the radial length 399 is slightly less than the radial distance 699 so that the washer 300 may be inserted into the recess 600 with a lateral gap 640 located between the washer 300 and each respective recess sidewall 610 and 620. For example, radial length 399 may be at least 90%, at least 91%, at least 92%, at least 93%, at least 94%, at least 95%, at least 96%, at least 97%, at least 98%, or at least 99% of radial distance 699. Further radial length 399 may be at most 99.9%, at most 99.5%, at most 99%, at most 98%, at most 97%, at most 96%, at most 95%, at most 94%, at most 93%, at most 92%, or at most 91% of radial distance 699.

In certain embodiments, the radial length 399 is less than the radial length 499 of the planar proximal surface 410 of the proximal end 401 of the wheel hub 144. For example, radial length 399 may be at most 99%, at most 98%, at most 97%, at most 96%, at most 95%, at most 94%, at most 93%, at most 92%, at most 91%, at most 90%, at most 85%, at most 80%, at most 75%, or at most 70%, of radial distance 499. Further, radial length 399 may be at least 50%, at least 60%, at least 70%, at least 80%, at least 90%, or at least 95% of radial distance 499.

As shown in FIG. 4, the outer joint 200 includes a radially-outer ring portion 280 that is located radially-outward from the recess 600. The radially-outer ring portion 280 forms the outer portion 272 of the planar surface 270. The radially-outer ring portion 280 may form the annular outer sidewall 620 of the recess 600. Thus, if the washer 300 breaks into more than one piece, the radially-outer ring portion 280 and annular outer sidewall 620 may trap the piece or pieces of the washer 300, i.e., debris, in the recess 600 and prevent migration of such pieces to other locations, such as to the magnet ring 60 (shown in FIG. 1). In this manner, the recess 600 and sidewalls 610 and 620 may protect the washer 300, and may protect other components from debris created by the breakdown of the washer 300.

Figure 6:
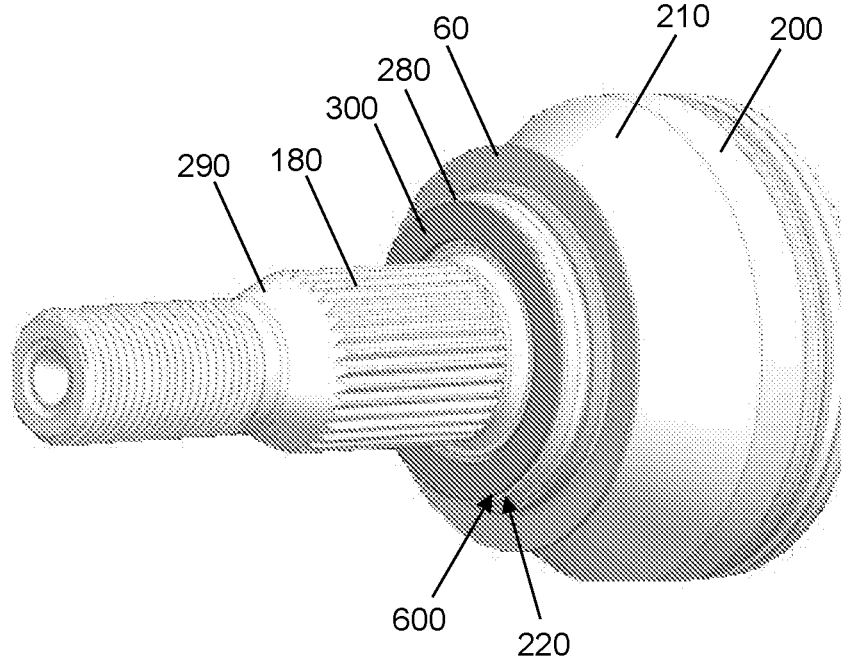
FIG. 6 is a perspective view of an outer joint holding a washer and a wheel sensor according to embodiments of the present disclosure.

FIG. 6 is a perspective view of the outer joint 200. As shown, the distal portion 290 of the outer joint 200 includes splines 180 for engagement with the wheel hub 144. Further, FIG. 6 illustrates the annular washer 300 positioned in the annular recess 600 formed in the shoulder 220 of the outer surface 210 of the outer joint 200. As shown, the radially-outer ring portion 280 is located radially-outward from recess 600.

In exemplary embodiments, the annular washer 300 is a simple disk shape and includes no radially-inward or radially-outward tabs or projections. Cross-referencing FIGS. 5 and 6, the inner sidewall 301 is cylindrical, outer sidewall 302 is cylindrical, proximal surface 303 is flat and annular, and distal surface 304 is flat and annular. As a result, the washer 300 does not include any corners or intersections where structural stresses may accumulate and lead to fracture.

Further, as shown in FIG. 6, the wheel sensor 60 may be a ring magnet that is also received on the outer surface 210 of the outer joint 200.

In embodiments herein, a noise-cancelation washer is 300 at least partially received within a recess formed between a wheel hub 144 and an outer joint 200. When the wheel assembly 114 is assembled, the washer 300 contacts the wheel hub 144 and the outer joint 200, as shown in FIG. 5. The washer 300 may help reduce or eliminate clicking noises. Further, the washer 300 may dampen vibrations due to the movement and rotation of the internal components by providing a stable and secure connection between the wheel hub 144 and the outer joint 200. Further, the washer 300 may minimize any relative movement or play between the wheel hub 144 and the outer joint 200 that could lead to noise generation. Also, the washer 300 may maintain the proper clearance between the wheel hub 144 and the outer joint 200.

The illustrated embodiments herein locate the recess 600 in the outer joint 200 only. However, it is contemplated that the recess 600 (and the sidewalls 610 and 620 and end wall 630) may be formed in the wheel hub 144. Alternatively, the recess 600 may be formed by a recess portion formed in the outer joint 200 and a recess portion formed in the wheel hub 144, such that the sidewalls 610 and 620 are formed by both the wheel hub 144 and the outer joint 200. In such an embodiment, the wheel hub 144 and the outer joint 200 would each form a respective end wall 630.

Accordingly, a wheel assembly 114 is provided for a vehicle 100. As described herein, the wheel assembly 114 prevents a risk of accumulation of debris from a damaged washer 300 on a ring magnet wheel sensor 60 in case of fracture due reversal torque direction during BEV energy regeneration events. Further, the washer 300 is provided as a simplified disk shape without projections, eliminating high stresses within the washer 300 that may otherwise be generated during energy regeneration events and high torque direction changes.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A wheel assembly for a vehicle, the wheel assembly comprising:

a knuckle;

a wheel hub configured to rotate within the knuckle, the wheel hub extending from a proximal end to a distal end, wherein the distal end is configured for engaging a wheel;

a constant velocity (CV) joint configured for transferring torque from power plant to the wheel hub, wherein the CV joint has an outer surface including a shoulder and a distal portion extending through the wheel hub;

a recess formed between the proximal end of the wheel hub and the shoulder of the CV joint;

a noise-canceling washer positioned in the recess, wherein the noise-canceling washer abuts the proximal end of the wheel hub and the shoulder of the CV joint, wherein the noise-canceling washer comprises a magnetic metal, and wherein the noise-canceling washer has a flat proximal surface abutting the proximal end of the wheel hub and a flat distal surface abutting the shoulder of the CV joint; and a nut threaded onto the distal portion of the CV joint to clamp the wheel hub and the CV joint together, thereby exerting a compression force on the noise-canceling washer between the shoulder of the CV joint and the proximal end of the wheel hub.

2. The wheel assembly of claim 1, wherein the recess has a depth, wherein the noise-canceling washer has a height, and wherein the height is greater than the depth.

3. The wheel assembly of claim 1, wherein the recess is formed in the shoulder of the CV joint, wherein the outer surface of the CV joint forms an inner annular sidewall, an outer annular sidewall, and a recess bottom surface extending from the inner annular sidewall to the outer annular sidewall.

4. The wheel assembly of claim 3, wherein the proximal end of the wheel hub has a planar surface with a radial length, wherein the noise-canceling washer has a radial length, and wherein the radial length of the planar surface of the proximal end of the wheel hub is at least 110% of the radial length of the noise-canceling washer.

5. The wheel assembly of claim 1, wherein the noise-canceling washer has a cylindrical inner sidewall and a cylindrical outer sidewall, and wherein the cylindrical inner sidewall and the cylindrical outer sidewall are parallel.

6. The wheel assembly of claim 1, wherein the recess is formed in the shoulder of the CV joint, and wherein a radially-outer ring portion of the CV joint is located radially outward from the recess and forms an outer annular sidewall of the recess.

7. The wheel assembly of claim 6, further comprising a wheel sensor comprising a ring magnet positioned on the outer surface of the CV joint, wherein the ring magnet and the noise-canceling washer are separate components, and wherein the outer annular sidewall of the recess is located radially between the noise-canceling washer and the ring magnet.

8. The wheel assembly of claim 6, wherein the proximal end of the wheel hub has a planar proximal surface that extends radially across the recess.

9. The wheel assembly of claim 1, wherein the recess has an inner annular sidewall located between a rotation axis of the wheel hub and the noise-canceling washer, and wherein the noise-canceling washer is separated from the inner annular sidewall by a gap.

10. The wheel assembly of claim 9, wherein the noise-canceling washer is separated from an outer annular sidewall of the recess by a second gap.

11. The wheel assembly of claim 10, wherein the nut exerts the compression force in an axial direction along a rotation axis of the wheel hub, and wherein the flat proximal surface and the flat distal surface of the noise-canceling washer each extend in a radial direction perpendicular to the rotation axis.

12. The wheel assembly of claim 9, wherein the inner annular sidewall is a portion of a right circular cylinder centered on the rotation axis of the wheel hub.

13. The wheel assembly of claim 1, wherein:

the recess has an open axial end facing the proximal end of the wheel hub and a closed axial end formed by a recess bottom surface;

the noise-canceling washer is received in the recess through the open axial end; and the noise-canceling washer protrudes from the recess beyond the open axial end.

14. The wheel assembly of claim 13, wherein the proximal end of the wheel hub covers the open axial end of the recess when the wheel hub and the CV joint are clamped together by the nut.

15. The wheel assembly of claim 1, wherein:

the noise-canceling washer is annular;

the CV joint extends through a central opening of the noise-canceling washer;

an inner annular sidewall of the recess is formed by the outer surface of the CV joint;

the flat proximal surface and the flat distal surface of the noise-canceling washer each extend in a radial direction perpendicular to a rotation axis of the wheel hub; and the wheel hub and the CV joint engage one another with splines.

16. The wheel assembly of claim 15, wherein an outer annular sidewall of the recess is formed by a radially-outer ring portion of the CV joint, such that the noise-canceling washer is radially bounded between the outer surface of the CV joint and the radially-outer ring portion of the CV joint.

17. The wheel assembly of claim 16, further comprising a wheel sensor comprising a ring magnet positioned on the outer surface of the CV joint, wherein:

the ring magnet and the noise-canceling washer are separate components;

the outer annular sidewall of the recess is located radially between the noise-canceling washer and the ring magnet;

the noise-canceling washer comprises steel; and the noise-canceling washer protrudes from the recess beyond the shoulder of the CV joint.

18. The wheel assembly of claim 15, wherein a recess bottom surface of the recess extends perpendicular to the rotation axis from the inner annular sidewall to an outer annular sidewall of the recess.

19. The wheel assembly of claim 1, wherein the noise-canceling washer comprises steel.

* * * * *